(12) United States Patent
Reiser et al.

(10) Patent No.: US 12,034,345 B2
(45) Date of Patent: Jul. 9, 2024

(54) DEVICE FOR POSITIONING AND CLAMPING WIRE ENDS FOR ELECTRIC MACHINES

(71) Applicant: GROB-WERKE GMBH & CO. KG, Mindelheim (DE)

(72) Inventors: Johannes Reiser, Kempten (DE); Markus Kaufmann, Kaltental (DE); Günter Dreier, Deisenhausen (DE)

(73) Assignee: GROB-WERKE GMBH & CO. KG, Mindelheim (DE)

(*) Notice: Subject to any disclaimer, the term of this patent is extended or adjusted under 35 U.S.C. 154(b) by 467 days.

(21) Appl. No.: 16/627,511

(22) PCT Filed: Jun. 12, 2018

(86) PCT No.: PCT/DE2018/100559
§ 371 (c)(1),
(2) Date: Dec. 30, 2019

(87) PCT Pub. No.: WO2019/007459
PCT Pub. Date: Jan. 10, 2019

(65) Prior Publication Data
US 2020/0153319 A1    May 14, 2020

(30) Foreign Application Priority Data

Jul. 4, 2017   (DE) .......................... 102017114932.5
Feb. 12, 2018  (DE) .......................... 102018103100.9

(51) Int. Cl.
*H02K 15/00*   (2006.01)
*H02K 3/12*    (2006.01)
(Continued)

(52) U.S. Cl.
CPC ........... *H02K 15/0087* (2013.01); *H02K 3/12* (2013.01); *H02K 3/50* (2013.01); *H02K 15/085* (2013.01)

(58) Field of Classification Search
CPC ....................... H02K 15/0087; H02K 15/0081
See application file for complete search history.

(56) References Cited

U.S. PATENT DOCUMENTS 6,425,175 B1   7/2002  Sawada et al.
6,490,779 B1   12/2002 Tokizawa et al.
(Continued)

FOREIGN PATENT DOCUMENTS

EP   1041696 B1   10/2000
EP   1041702 A2   10/2000
(Continued)

OTHER PUBLICATIONS

International Search Report; priority document.

*Primary Examiner* — Livius R. Cazan
(74) *Attorney, Agent, or Firm* — Greer, Burns & Crain, Ltd.

(57) ABSTRACT

To enhance process reliability when processing wire ends during the course of a production of a machine element of an electric machine, a positioning and clamping device configured to position and clamp one or several wire ends for further processing during the course of the production of the machine element of the electric machine, comprises a capturing device for capturing and positioning the at least one wire end, wherein the capturing device has at least one oblique guide for the relative positioning of the at least one wire end. Furthermore, a corresponding clamping and positioning method is described.

9 Claims, 9 Drawing Sheets

(51) Int. Cl.
*H02K 3/50* (2006.01)
*H02K 15/085* (2006.01)

(56) References Cited

U.S. PATENT DOCUMENTS

| | | |
|---|---|---|
| 9,455,614 B2 | 9/2016 | Corbinelli et al. |
| 2006/0141874 A1 | 6/2006 | Lenoir et al. |
| 2014/0007415 A1* | 1/2014 | Corbinelli .......... H02K 15/0087 29/596 |
| 2015/0180319 A1 | 6/2015 | Kimura et al. |
| 2017/0117782 A1 | 4/2017 | Hirao |

FOREIGN PATENT DOCUMENTS

| | | | |
|---|---|---|---|
| EP | 1554794 B1 | | 9/2010 |
| EP | 2684283 B1 | | 1/2015 |
| JP | 2004135438 A | | 4/2004 |
| JP | 2005130577 A | * | 5/2005 |
| JP | 2013165615 A | * | 8/2013 |

\* cited by examiner

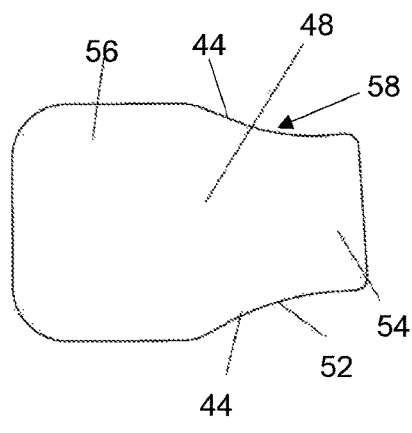
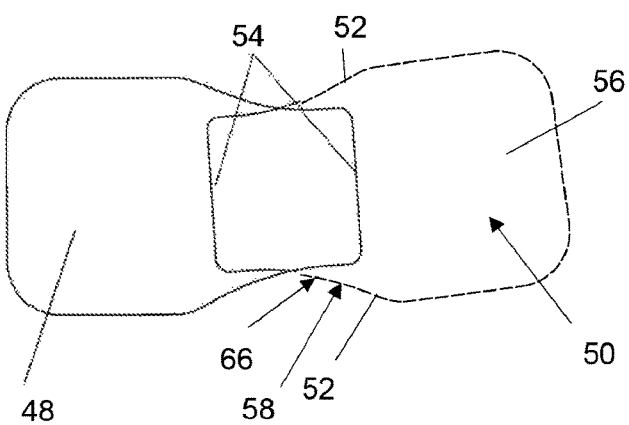
Fig. 13
Fig. 14
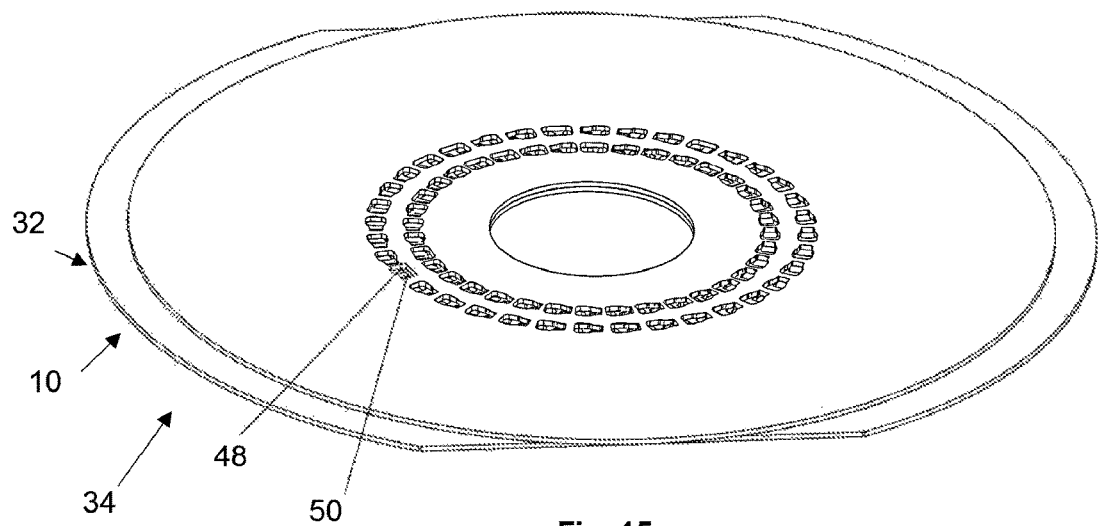
Fig. 15
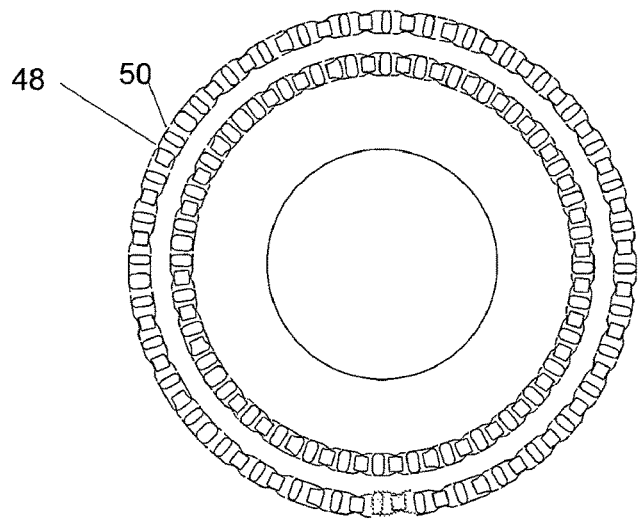
Fig. 16

DEVICE FOR POSITIONING AND CLAMPING WIRE ENDS FOR ELECTRIC MACHINES

CROSS-REFERENCES TO RELATED APPLICATIONS

This application claims the benefit of the International Application No. PCT/DE2018/100559, filed on Jun. 12, 2018, and of the German patent application No. 10 2018 103 100.9 filed on Feb. 12, 2018 and of the German patent application No. 10 2017 114 932.5 filed on Jul. 4, 2017, the entire disclosures of which are incorporated herein by way of reference.

FIELD OF THE INVENTION

The invention relates to a positioning and clamping device for positioning and clamping together wire ends for further processing during the course of a production of a machine element of an electric machine. The invention further relates to a production device for producing a machine element of an electric machine including such a positioning and clamping device. The invention further relates to a positioning and clamping method for positioning and clamping wire ends for further processing during the course of a production of a machine element of an electric machine. Finally, the invention relates to a method for connecting wire ends during the course of the production of an electric machine using such a positioning and clamping method.

BACKGROUND OF THE INVENTION

Electrical machines are understood to be, in particular, machines for converting electrical energy into kinetic energy and machines for converting kinetic energy into electrical energy. In particular, this term is to be understood to mean electric motors and generators.

When manufacturing machine elements of such electric machines, such as stators and rotors, for example, it is often necessary to connect ends of electrical conductors formed from wires with each other or otherwise process them together, such as cut them or shape them together, for example.

For instance, there are electric motors in which coil windings, particularly of the stator, are formed from different wire pieces whose ends are then connected together. In this connection, EP 2 684 283 B1, EP 1 554 794 B1 and EP 1 041 696 B1, for instance, describe devices and methods for connecting wire ends of hairpins in order to form stator windings of electric machines, in which the wire ends are welded together. Here, devices and methods for positioning and clamping the wire ends prior to welding are provided.

SUMMARY OF THE INVENTION

The invention has an object of improving such devices and methods for positioning and clamping wire ends particularly with respect to accuracy and a smaller design-related effort.

In order to achieve this object, the invention creates a positioning and clamping device and a positioning and clamping method according to the attached independent claims. Advantageous uses are specified in the coordinated independent claims.

Advantageous embodiments are the subject matter of the dependent claims.

According to a first aspect, the invention provides a positioning and clamping device for positioning and clamping at least one wire end—preferably for positioning several wire ends, e.g., a wire end pair or a wire end triple, relative to each other and clamping them together—for further processing during the course of a production of a machine element of an electric machine, comprising:

a capturing device for capturing and positioning the wire end or wire ends, wherein the capturing device has at least one oblique guide for the relative positioning of the wire ends.

Preferably, the at least one oblique guide, during a relative movement in the circumferential direction of the positioning and clamping device, causes the at least one wire end to be guided in a radial direction.

Preferably, one first oblique guide, which extends in the circumferential direction of the positioning and clamping device and in a radial direction, and another oblique guide, which extends in an axial direction and in a radial direction, are provided.

Preferably, the capturing device has a first element with a first recess and a second element with a second recess.

Preferably, the first and second elements can be moved relative to each other, wherein the recesses overlap each other at least partially in such a way that rims of the recesses move closer towards or apart from each other during the course of the relative movement.

Preferably, at least one rim at at least one of the recesses extends at least partially obliquely so as to form the at least one oblique guide.

Preferably, opposite rims of at least one of the recesses form a funnel-shaped oblique insertion region.

Preferably, an oblique guide is provided on both the first recess and the second recess in such a way that the oblique guides of the first and second recesses cooperate.

Preferably, at least one first rim of the first recess extends at least partially obliquely and at least one first rim of the second recess overlapping with the first rim extends at least partially obliquely, wherein the inclination directions of the obliquely extending regions of the first and second recesses are opposite.

Preferably, opposite rims of the first recess form a first funnel-shaped oblique insertion region, and opposite rims of the second recess form a second funnel-shaped oblique insertion region, wherein the oblique insertion regions are disposed opposite to each other.

Preferably, the at least one rim that extends at least partially obliquely is a rim extending in the circumferential direction.

Preferably, the first and/or the second element are configured as a disk or annular disk or as a disk segment or annular disk segment.

Preferably, the first and second elements can be rotated relative to each other about a common rotation axis.

Preferably, a plurality of first and second recesses is disposed distributed about an axis, wherein several first and/or second elements are provided, which, relative to each other, can be moved radially with respect to the axis.

Preferably, the capturing device itself is already configured for fixing and clamping the at least one wire end. In particular, not only can the at least one wire end or pair or triple of wire ends be pre-positioned between the above-mentioned first element and the above-mentioned second element of the capturing device, but can also be fixed in their positions and clamped.

In an alternative configuration, it may also be provided that, in addition to the capturing device, a fixing and clamping device for fixing and clamping the at least one wire end pre-positioned by means of the capturing device is also provided.

Preferably, the fixing and clamping device has a fixing and clamping member, which is movable relative to the capturing device, for fixing and clamping the at least one wire end between the capturing device and the fixing and clamping member.

Preferably, the fixing and clamping device has a fixing and clamping member and a counter-holder, which can be moved relative to each other for fixing and clamping the at least one wire end between them.

Preferably, the fixing and clamping device has, as a fixing and clamping member, a movably driven plunger.

Preferably, the capturing device and the fixing and clamping device are provided with a common drive unit or coupled drive units for performing the capturing, pre-positioning, fixing and clamping during the course of a movement, or that the capturing device and the fixing and clamping device can be moved independently of each other.

Preferably, an insertion aiding means for axially inserting wire ends into the capturing device is provided, with at least one insertion aid extending in the axial direction and/or with an oblique insertion portion extending in the axial direction and/or an insertion funnel extending in the axial direction.

Preferably, the insertion aiding means is configured in a stationary manner, and the capturing device has at least one element that can be moved or rotated relative to the insertion aiding means.

Preferably, the capturing device and/or the fixing and clamping device and/or the insertion aiding means are configured as a single-item device for handling one wire end pair.

Alternatively, the capturing device and/or the fixing and clamping device and/or the insertion aiding means are preferably each configured as a multiple-item device for simultaneously handling a plurality of wire end pairs.

Preferably, the capturing device and the fixing and clamping device are provided with a common drive unit or coupled drive units for performing the capturing, pre-positioning, fixing and clamping during the course of a movement. Alternatively, the capturing device and the fixing and clamping device can preferably be moved independently of each other.

Particularly preferably, however, the capturing device itself is configured not only for capturing and pre-positioning, but for clamping and fixing wire ends. In particular, this takes place by means of a relative movement of a first and a second element of the capturing device with cooperating recesses, in which, at least on one element, an oblique guide is formed on a rim in order to transfer the wire ends into a narrower overlapping region of the partially overlapping recesses, where they are fixed and clamped between two opposed end edges of the recesses.

According to another aspect, the invention provides a production device for producing a machine element of an electric machine, comprising a positioning and clamping device according to any one of the preceding configurations, and a processing device, in particular a welding device, a cutting device and/or forming device for processing the clamped wire end or the clamped wire ends (together).

Particularly preferably, the production device is configured for producing a coil winding of the electric machine. The production device may also be configured for producing a stator with a coil winding.

According to another aspect, the invention provides a positioning and clamping method for positioning and clamping at least one wire end—preferably for positioning several wire ends, e.g., a wire end pair or a wire end triple, relative to each other and clamping them together—for further processing during the course of a production of an electric machine, comprising the step a) capturing and positioning the wire end(s), wherein step a) takes place by means of at least one oblique guide.

Preferably, step a) comprises:
a1) capturing the wire end(s), transferring the wire end(s) into a fixing position, in particular bringing the wire ends closer to each other in a fixing position, and holding the wire end(s) in the preliminary position.

Preferably, step a) comprises:
a2) relative movement of a first element with at least one first recess and a second element with at least one second recess.

Preferably, step a) comprises:
a3) capturing and positioning between rims of the first and second recesses moving relative to each other, wherein at least one of the relatively moving rims extends at least partially obliquely.

Preferably, step a) comprises:
a4) capturing and positioning by means of an oblique inserting portion.

Preferably, step a) comprises:
a5) capturing and positioning between oblique rims that are opposite to each other in a funnel shape.

Preferably, step a) comprises:
a6) capturing and positioning by means of oblique inserting portions which extend in opposite directions and can be moved relative to each other in opposite directions.

Preferably, step a) comprises:
a7) capturing and positioning by means of insertion funnels that are opened toward each other and can be moved in opposite directions relative to each other.

Preferably, individual wire ends or wire end portions are individually positioned and clamped.

Preferably, a group of several individual wire ends or several wire end pairs, are jointly positioned or clamped.

Preferably, step a) is carried out for capturing and pre-positioning the at least one wire end, and further, step b), fixing and clamping the at least one pre-positioned wire end, is provided.

Preferably, step b) comprises:
b1) bringing the at least one wire end pre-positioned in step a) into the position thereof desired for further processing.

Preferably, step b) comprises:
b2a) applying a clamping force to the at least one wire end between a first and a second element of a capturing device, wherein the elements are moveable relative to each other or rotatable relative to each other, and wherein the at least one oblique guide is provided on at least one of the elements of the capturing device.

The execution of step b2a) is preferred at present, because positioning and fixing and clamping can thus be carried out in a single device. However, as an alternative to step b2a), step b) may also comprise step b2b) and/or step b2c):

b2b) applying a clamping force to the at least one wire end between a capturing device configured for carrying out step a) and a fixing and clamping member movable relative thereto, or b2c) applying a clamping force to the at least one wire end between a fixing and clamping member provided separately from a capturing device for carrying out step a), and a counter-holder provided separately.

Preferably, the steps a) and b) are carried out in one joint movement.

In one embodiment of the method, it is provided that wire ends or wire end pairs are individually positioned and clamped.

Preferably, however, a group of several individual wire ends or several wire end pairs, are jointly positioned or clamped.

According to another aspect, the invention provides a method for connecting wire ends during the course of the production of an electric machine, comprising the execution of a positioning and clamping method according to any one of the preceding embodiments and the connecting of the clamped wire ends, in particular by means of welding.

Preferably, the wire ends of hairpins are connected during the course of a production of a stator of an electric machine.

Particularly preferably, the methods and devices described herein can be employed in the methods for producing coil windings of electric machines as they are described and shown in EP 2 684 283 B1, EP 1 554 794 B1 and EP 1 041 696 B1, so that reference may be made to these documents for further details. Compared to this prior art, particularly preferred embodiments of the methods and devices presented herein are characterized by a more exact positioning and clamping of the wire ends, or one that is simpler with regard to design and process engineering.

However, the positioning and clamping methods illustrated herein are not only suitable for positioning wire ends prior to welding, but also for positioning wire ends for other processing methods.

In particular, preferred embodiments of the invention relate a fixing system for one or several wire ends (with a round, angled or any other contour) for forming, machining, cutting or welding.

Due to the non-exact position and a highly accurate clamping of the wire ends necessitated by the process, a very complex clamping device is frequently required.

For some processing steps, wire ends need to be brought from an inexactly defined position into an exact location for further processing. Normally, this is carried out with a defined clamping system.

In a preferred embodiment, the wire is first captured in a capturing device and then brought via an oblique guide into a fixing position, where it is clamped and retained in its position. In particular, wire ends are captured together and then brought into an exact position via the oblique guide and clamped together. This can be carried out, in particular, via two overlapping recesses that are movable relative to each other, wherein at least one first recess has a broader region and a narrower region, and an oblique guide at at least one rim, wherein the transfer from the wider into the narrower region and clamping is carried out via relative movements of the recesses.

In one configuration, the first and second recesses may have a broader region and a narrower region which, in the first and second recesses, are respectively formed on opposite ends.

The oblique guide may be provided on one side, only on one of the two rims between the narrower and the wider region of the at least one recess, or may be provided at opposite rims, so as to result in a insertion funnel.

In another embodiment of the invention, the process is divided into two steps.

a) Capturing and pre-positioning

The wire is captured by means of a mechanical device and brought into an as yet inexactly defined position.

The wire ends are roughly held in position but not yet clamped.

b) Fixing and clamping

With a mechanical solution, the wire or wires are then brought against the capturing device or with separate counter-holders into an exact position, and thus also clamped.

The clamping force for exact positioning and fixing is thus applied in step b).

The capturing and also the fixing device may be configured as a single-item device or also as a device accommodating several wire ends or bundles.

The capturing and fixing process may be actuated with a single movement or also with several movements.

The wires may be captured on oblique planes with two elements running in opposite directions.

Capturing may be carried out with any shape (e.g., oblique inserting portion).

Clamping may be carried out with a plunger or any other shape.

In general, the clamping principle illustrated herein may be applied to any wire processing. Particularly preferably, it is specifically used for clamping hairpins or other wire ends fitted into the stator of an electric motor prior to welding.

Particularly preferred embodiments relate to a device and a method for clamping wire ends to be welded together.

Preferably, the wire ends are to be positioned very precisely, in the micrometer range.

Preferably, the device and the method are configured to clamp the wires, e.g. those located in the grooves of a stator, to form wire pairs and to position them in order to weld them together.

Preferably, the wire pairs are clamped together and positioned in the radial and axial directions in such a way that the requirements with regard to the positioning of the two welding partners defined by the respective welding process are appropriately satisfied.

A preferred configuration of a capturing device has at least two elements disposed one above the other. The elements disposed one above the other move in opposite directions relative to each other in order to clamp the unorganized wire pairs to form pairs. Correspondingly shaped recesses are incorporated into the elements.

Preferably, the recess of a first element has a rectangular shape. Preferably, the recess of the second element moving in the opposite direction has one or two obliquely configured surfaces. Preferably, the latter lead into a rectangular shape.

Preferably, the positioning and clamping device is movable relative to a machine element from which the wire ends protrude. For instance, a stator with wires, such as, in particular, hairpins, which are inserted into the grooves of the stator, is provided, onto which the positioning and clamping device is placed.

At the point in time the device is placed onto the machine element, e.g., the stator, containing the non-aligned wires, the two correspondingly shaped recesses in the elements are located directly one above the other.

Accordingly, the non-aligned wires are located in an undefined manner within the two recesses of the elements. Once the two elements move in opposite directions relative to each other, the wires are positioned relative to each other by an oblique guide formed on at least one of the recesses.

For example, the wires are pushed through the rectangular cutout of an element, along the oblique portion(s) of the cutout of another element, into a rectangular shape of the other element leading thereinto.

In a preferred embodiment, the aligning process is completed once the wire pair is located in the rectangular shape of the other element. In this embodiment, the positioned wire pairs can thus be processed in this position of the device, e.g., welded together.

In previous concepts for positioning and clamping wire ends, the aligning process of the wire pairs requires several individual devices to be driven separately. On the one hand, disks rotating in opposite directions are required and, on the other hand, radially disposed grippers. The grippers for alignment in the tangential direction are difficult to configure and complex to move due to lack of space.

One advantage of the preferred embodiment of the invention lies in the fact that the aligning process of the wire pairs to be welded together is carried out in only a single step. Accordingly, no additional elements are required for alignment in the tangential direction.

In one embodiment, the elements of the positioning and clamping device may be configured to be movable tangentially relative to the stator. This can be realized, for example, with disks or annular disks that are capable of rotating relative to each other about the center axis of the stator.

In another embodiment, the elements of the positioning and clamping device move radially to the stator. For example, this can be realized by the recesses or cutouts for capturing the wire ends being distributed, in at least one of the elements, among several segments capable of moving radially relative to the other element.

Preferably, the wire ends can be positioned and clamped solely by means of two rotating disks, which are disposed one above the other, as elements of the capturing device.

The cut-out portions of one or preferably both clamping disks may be trapezoidal.

In an advantageous embodiment, it is provided that another disk may be provided, which is preferably not movable and into which insertion bevels are incorporated, by means of which the wire ends are "caught" prior to positioning, i.e., a positioning takes place such that the wire ends are able to end up in the cut-out portions of the clamping disks.

Preferably, the positioning and clamping device serves for positioning and clamping wire ends protruding from a housing of a component, preferably of an electric machine, during the course of the production step. In particular, in a housing of a stator in which coil windings are produced by means of hairpins, the ends of the hairpins protrude after being inserted into the grooves of the housing. By bending adjacent ends into the opposite circumferential direction, pairs of wire ends, which are to be connected with each other, are formed in order thus to form coil windings.

Accordingly, the positioning and clamping device is provided with annular arrangements of recesses that can be rotated relative to each other in order to clamp the protruding ends of a plurality of wire end groups (for example, the number of the wire ends to be clamped together corresponds to the number of grooves times a natural number, which depends on the number of wire segments accommodated in each groove).

Preferably, the component with the protruding wire ends is moved in the direction of the extent of the wire ends (e.g., axially in the case of an annular component) relative to the positioning and clamping device. Preferably, insertion bevels extending obliquely to the direction of relative movement during insertion are provided for inserting the wire ends into recesses of the positioning and clamping device. Preferably, the insertion bevels are arranged in a funnel shape, so that they facilitate insertion into the recesses during the relative movement. In the case of an annular housing with wire ends that, circumferentially distributed, protrude therefrom, the relative movement preferably takes place in the axial direction (viewed relative to a center axis of the housing).

For example, hairpins are inserted through the insertion bevels in the aligned recesses of a first and a second element, which are preferably configured as disks, e.g., clamping disks, of a capturing device. For example, the insertion bevels may be provided on a stationary element, particularly on a base place, on which the first and the second element of the capturing device are movably mounted, in particular rotatably mounted, more particularly mounted so as to be rotatable about a common rotation axis which, when the method is carried out, is disposed so as to coincide with the center axis of the housing.

Preferably, the fixing and clamping device can be used, in particular, as a welding template or welding jig for welding wire end groups together during the course of the production of a component of an electric machine.

Preferably, the fixing and clamping device has three disks lying one above the other. The lowermost (or, alternatively, uppermost) disk is preferably a non-movable disk. The insertion bevels are preferably incorporated into it. The mounting and actuation of the first and second clamping disks (example for elements of the capturing device) is connected to this lowermost disk. Thus, this may be a type of baseplate on which all further components may be mounted, e.g., screwed.

When the welding jig is being positioned, the two clamping disks are preferably opened, and the wire ends, e.g., ends of hairpins, are axially "caught" by the insertion bevels and "sorted" towards the future welding positions, because a certain wiring of the electric motor should be given.

BRIEF DESCRIPTION OF THE DRAWINGS

Exemplary embodiments will be explained in more detail below with reference to the attached drawings. In the drawings:

FIG. 13 shows a top view onto a first recess of the positioning and clamping device from FIGS. 10 to 11;

FIG. 14 shows a top view onto the first recess, wherein an overlap with a second recess of the positioning and clamping device in a clamping position for clamping the wire ends is indicated;

FIG. 15 shows a view as in FIG. 10, wherein the positioning and clamping device is depicted in the clamping position for clamping the wire ends;

FIG. 16 shows a view as in FIG. 11, wherein the clamping position is depicted;

DETAILED DESCRIPTION OF THE PREFERRED EMBODIMENTS

Figure 1:
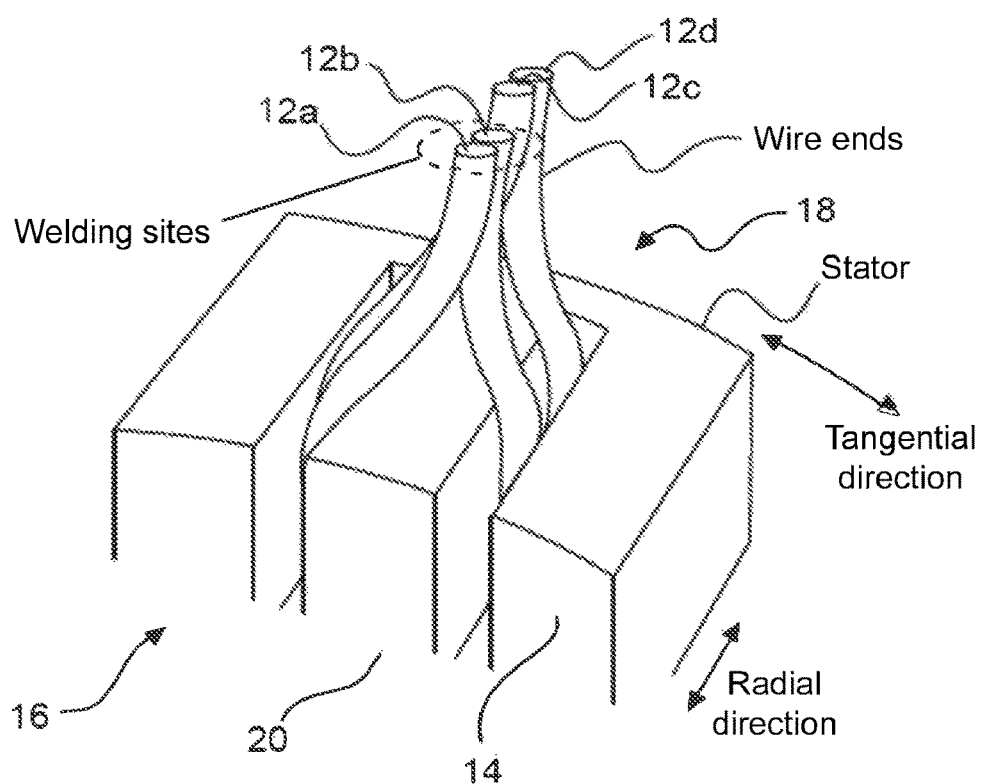
FIG. 1 shows a perspective partial view of a machine element of an electric machine with reference to the example of a stator of an electric motor during the course of the production, in this case particularly during the course of the production of coil windings, particularly from hairpins, wherein the wire ends to be processed further protrude from the machine element.

With reference to the attached Figures, embodiments of a positioning and clamping device 10 for positioning and clamping one or several wire ends 12a, 12b, 12c, 12d for further processing during the course of a production of a machine element 14 of an electric machine will be explained below based on the example of the production of a stator 16 of an electric motor.

Here, a stator 16 of an electric motor is to be produced, for instance, which serves as a driving engine for a vehicle, such as an electric passenger vehicle, and is supposed to have an output power in the range of 10 kW to 500 kW, preferably between 20 kW and 200 kW. In this respect, the goal is to produce a coil winding 18 that is as compact and powerful as possible.

According to the production step shown in FIG. 1, the coil winding 18 is produced for this purpose from several stirrup-like wire pieces, so-called hairpins, which have a U-shaped bend, which is not shown, at their one end and which are fitted with their free wire ends 12a, 12b, 12c, 12d into grooves 20 of the stator 16. Then, the wire ends 12a, 12b, 12c, 12d are bent towards each other and are to be connected with each other in a next further processing step, in order to produce a continuous coil winding 18 by a connection of directly or preferably indirectly (e.g., across several grooves 20) adjacent hairpins. For more details regarding the production steps, which are not shown in more detail herein, and the further structure of the stator and the hairpins, reference is made to EP1 554 794 B1, EP 2 684 283 B1 and EP 1 041 696 B1, the disclosures of which are incorporated herein by reference.

The wires of the hairpins have a right-angled cross section, for example, with a width in the range of 2 mm to 8 mm, e.g., 4.7 mm or 6 mm, and a height between 0.75 mm to 4 mm, e.g., 2.36 mm or 1.7 mm.

The number of wire pairs to be connected is, for example, between 12 and 164, e.g., 36, 58 or 72 wire pairs. One or several rows of hairpins disposed one next to each one another can be disposed on the stator.

In order to connect them, the protruding wire ends 12a, 12b, 12c, 12d are first pre-bent and then positioned relative to one another and clamped, in order to then be processed further, in particular, formed, cut, and, in particular, connected to one another, in particular, welded to one another. For this purpose, the wire ends 12a, 12b, 12c, 12d have to be positioned very precisely for laser welding; e.g., tolerances of 1/10 mm at most are permitted.

Figure 2:
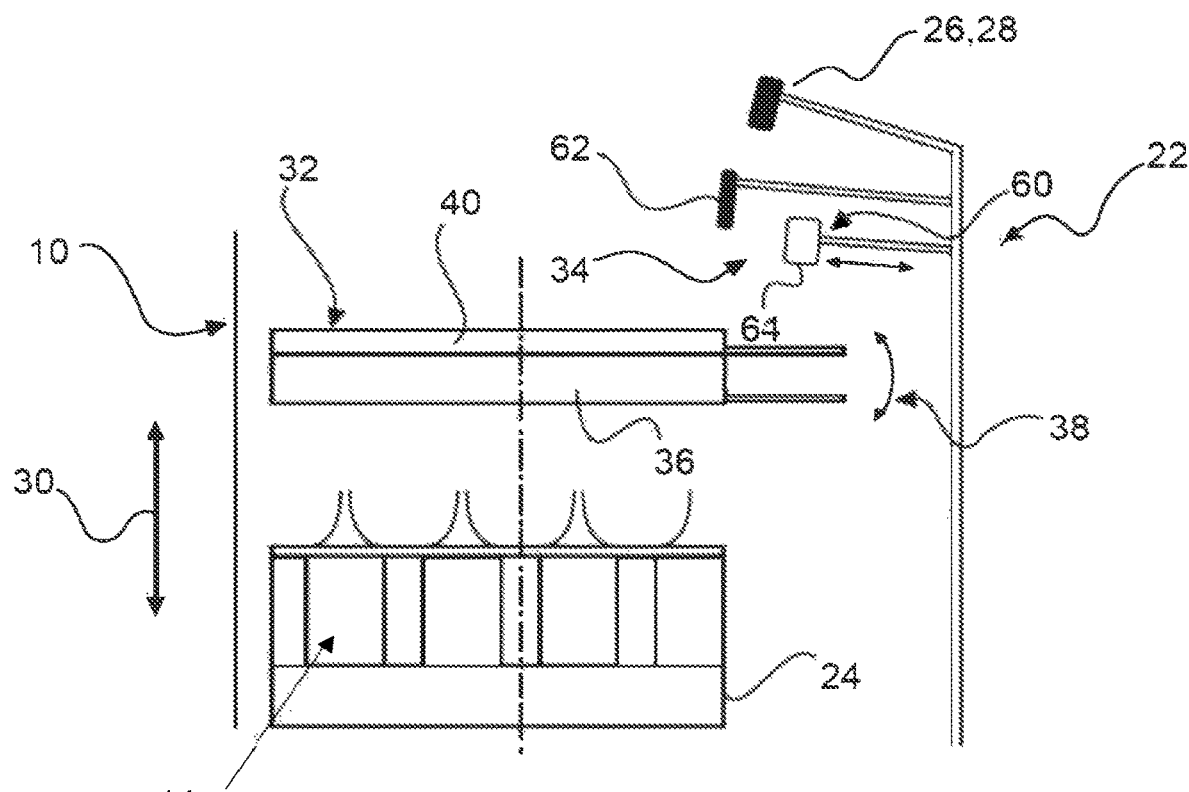
FIG. 2 shows a schematic view of a production device for carrying out at least one production step for producing a machine element, wherein the production device has a positioning and clamping device for positioning and clamping the wire ends.
Figure 3:
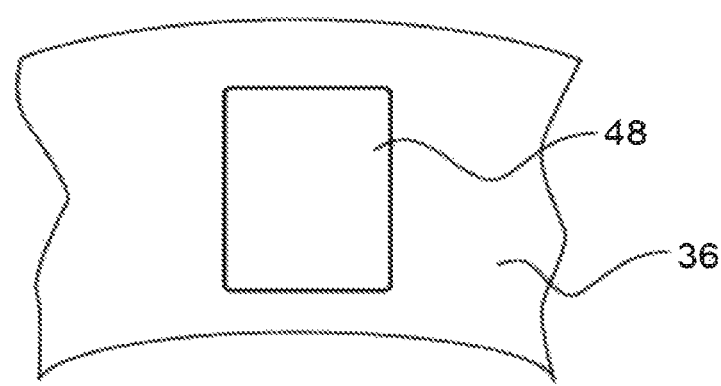
FIG. 3 shows a top view onto a partial area of a first element of a capturing device of the positioning and clamping device configured for capturing and positioning wire ends, with a first recess.
Figure 4:
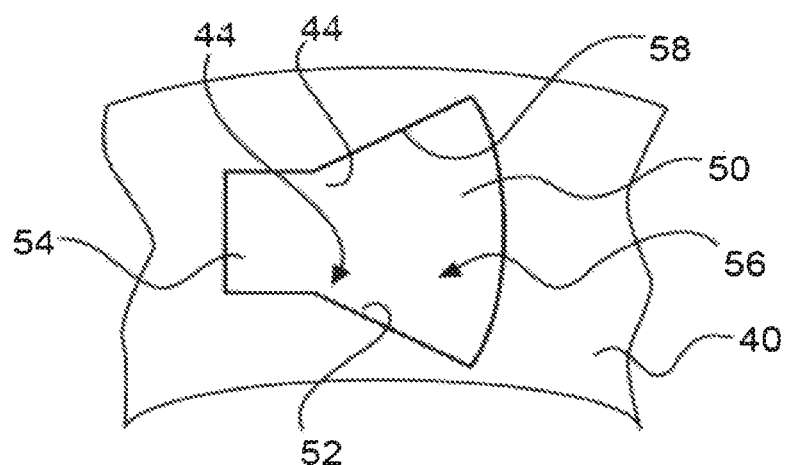
FIG. 4 shows a top view onto a partial area of a second element of the capturing device with a second recess provided with an oblique guide.
Figure 5:
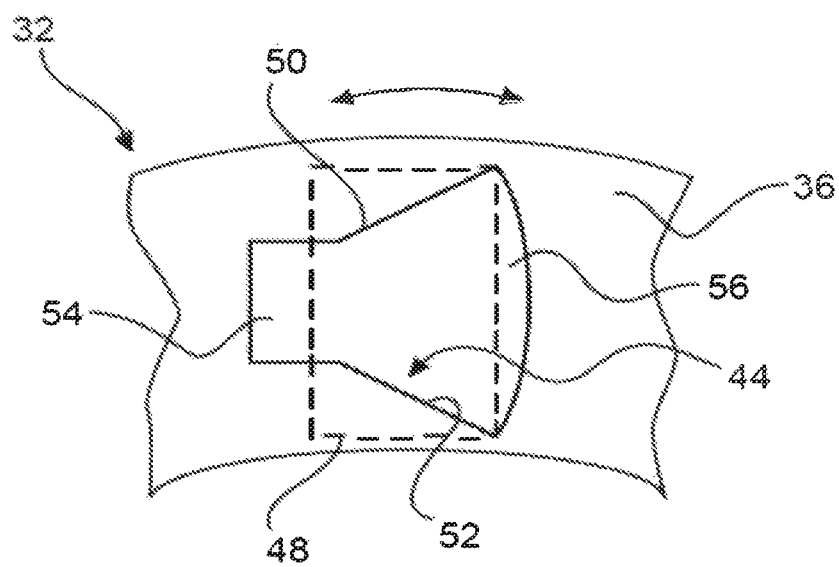
FIG. 5 shows a schematic top view onto a partial area of a first embodiment of the capturing device in which the elements are disposed one above the other and the elements rotate relative to each other tangentially to an axis of the machine element.

FIG. 2 shows a production device 22 for carrying out a production step, such as the step of producing the coil winding 18, for example. The production device 22 has a bracket 24 for the machine element 14, the positioning and clamping device 10 and a machining device 26, e.g., a (laser) welding device 28.

On a machine bed or the like, the positioning and clamping device 10 is mounted in a manner movable relative to the bracket 24 in such a way that it can be placed on the machine element 14, which is indicated by the arrow 30.

The positioning and clamping device 10 has a capturing device 32, which also serves as a fixing and clamping device 34 in some embodiments. In another embodiment, the positioning and clamping device 10 has a capturing device 32 and an optional separate fixing and clamping device 34.

The capturing device 32 is provided for capturing the wire ends 12a, 12b, 12c, 12d and for positioning them. In particular, the wire ends are at least pre-positioned here.

The fixing and clamping device 34 serves for fixing and clamping the wire ends 12a, 12b, 12c, 12d, which have at least been prepositioned by the capturing device.

A separate fixing and clamping device 34 is provided optionally, and may be omitted in other configurations; in that case, the tasks of fixing and clamping are also taken on by the capturing device 32. Tests have shown that fixing and clamping can be carried out, also in a highly precise manner, solely with the capturing device 32 of the embodiment explained with reference to the FIGS. 2 to 5 and 7 as well as 10 to 20.

An exemplary embodiment of the capturing device 32 is described in more detail below with reference to the illustrations of FIGS. 2 to 5 and 7 as well as 10 to 22.

Preferably, the capturing device 32 has a first element 36 and a second element 40 and a driving device 38 for relative movement of the first 36 and second elements 40.

The capturing device 32 has at least one oblique guide, in this case, a first oblique guide 44, for instance. In one embodiment, at least one wire end 12a, 12b, 12c, 12d, during a relative movement of the elements 36, 40 of the capturing device 32, can be positioned by means of the oblique guide—e.g., the first oblique guide 44—both in a direction tangential to a center axis 46 through the capturing device 32 (which, in particular, is to be orientated concentrically with a center axis of the machine element 14) and radial to the center axis 46.

The elements 36, 40 of the capturing device 32 are configured as disks, particularly as annular disks, in the exemplary embodiment shown in FIGS. 2 to 5 and 10 to 22.

The first element 36 has several first cutouts or recesses 48, and the second element 40 has several cutouts or recesses 50. In the exemplary embodiments shown, the first oblique guide 44 is formed by at least one at least partially oblique rim 52 of the respective second recesses 50.

In the exemplary embodiment of FIGS. 2 to 5 and 7, the first recess 48 has a rectangular contour, and the second recess 50 has a narrower region 54 and a wider region 56, wherein the rims 52 connecting these regions 54, 56 extend in a conically oblique manner to each other, so that a funnel-shaped oblique inserting portion 58 is formed.

The orientation of the oblique rim is such that it is directed, with one of its directional components, in the direction of relative movement of the elements 36, 40 of the capturing device 32, wherein the narrower region 54 is formed on a rim of the second recess 50 pointing in the direction of movement.

FIGS. 2 to 5 and FIGS. 7 and 10 to 22 show the configuration of the two elements 36, 40 as disks that can be rotated relative to each other about the center axis 46, so that the first and second recesses 48, 50, tangentially to the center axis, are movable relative to each other.

Figure 6:
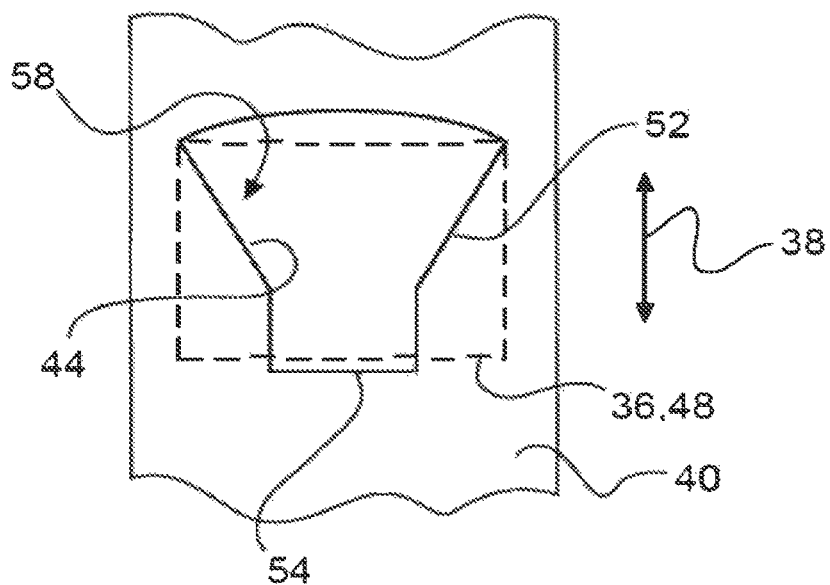
FIG. 6 shows a schematic top view onto a partial area of a second embodiment of the capturing device in which the elements move relative to each other radially to an axis of the machine element.

FIG. 6 shows a modification in which the two recesses 48, 50 can be moved relative to each other not tangentially, but radially to the center axis. For example, this may be realized by at least one of the two elements being formed from a series of segments that can be moved radially by the driving device 38.

Figure 7:
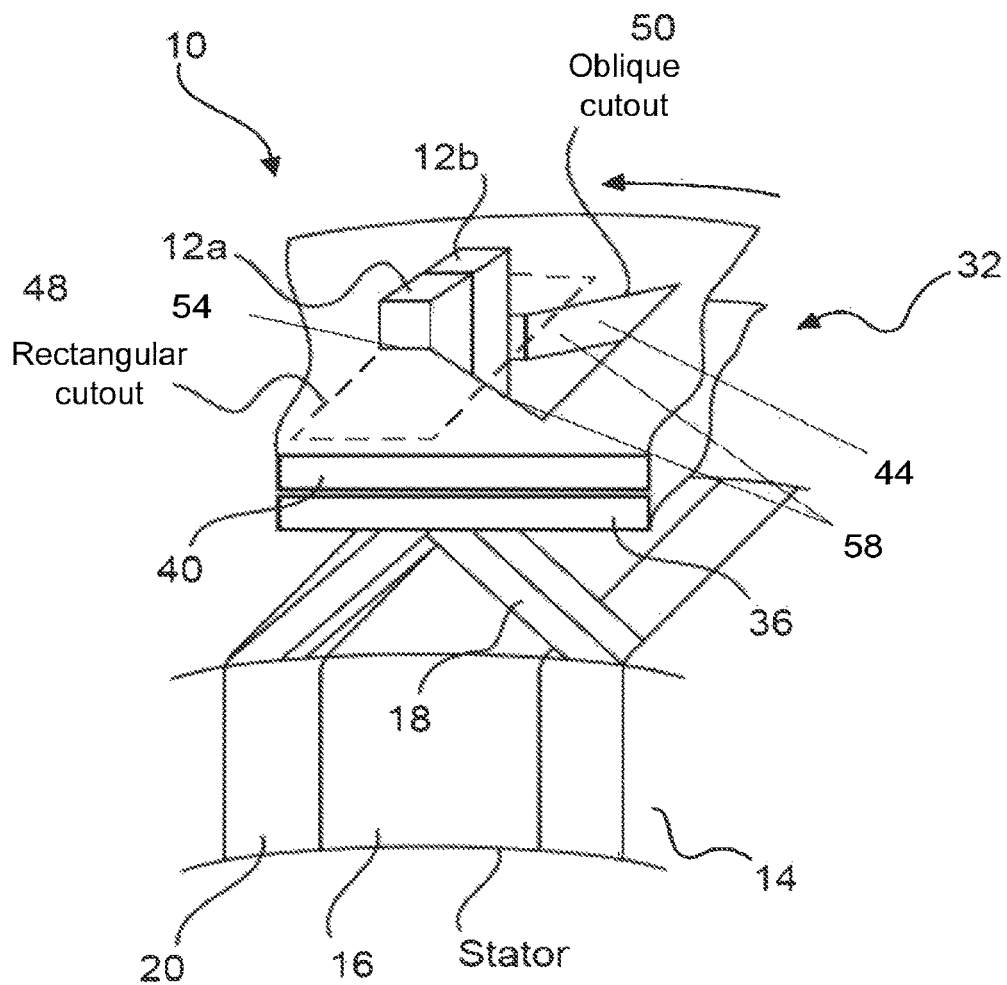
FIG. 7 shows a perspective view of the capturing device placed upon the protruding wire ends during the operation of the positioning and clamping device.

FIG. 7 shows the operation of the capturing device 32. For this purpose, the first and second recesses 48, 50 are orientated relative to each other in such a way, by means of a corresponding relative position of the first and second elements 36, 40, that a passage with as large an opening width as possible is formed, and then the capturing device 32 is moved in the direction towards the machine element 14 in order to capture the wire ends 12a, 12b, 12c, 12d in the passage. Then, the first and second elements 36, 40 are moved relative to each other, wherein the passage becomes smaller due to the first oblique guide 44 or the oblique inserting portion 58 forming the latter. The wire ends 12a, 12b are orientated tangentially and radially along the oblique guide 44 by the rim of the first recess 48 and inserted into the narrower region 54, where they are at least pre-positioned.

FIG. 2 shows an exemplary embodiment with a merely optionally provided, separate fixing and clamping device 34, by means of which, after a prepositioning by means of the capturing device 32, a clamping force is applied between the fixing and clamping member 60 and a counter-holder 62 by a fixing and clamping member 60, in order thus to position the wire ends 12a, 12b even more precisely and clamp them.

This may be advantageous in situations where the wire ends 12a, 12b, for example, have become twisted due to the grasp of the oblique guide and therefore cannot be positioned quite exactly between the first and second elements 36, 40, or at least not with a relative force that is acceptable with regard to the construction effort.

For example, the fixing and clamping member 60 may include a plunger 64.

Figure 8:
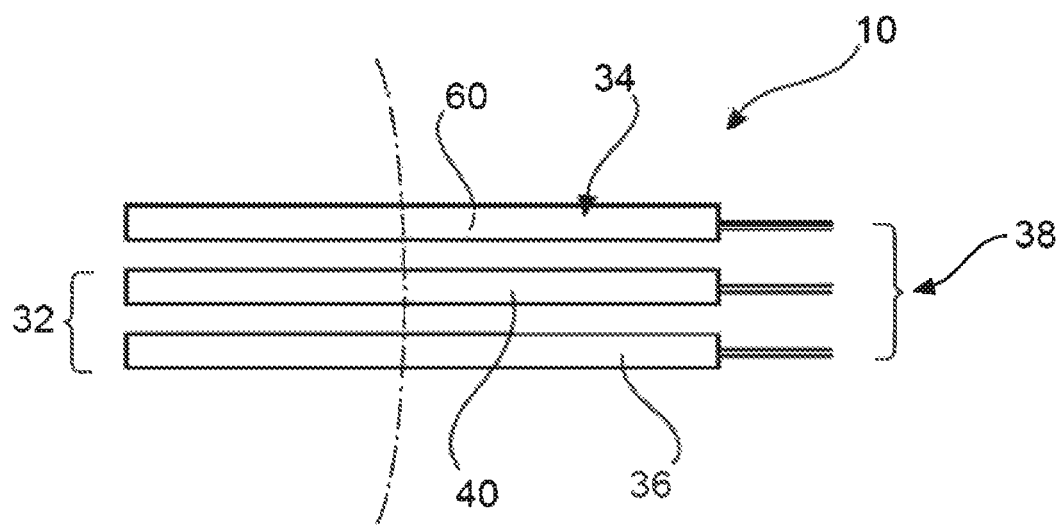
FIG. 8 shows a side view of another embodiment of the positioning and clamping device.
Figure 9:
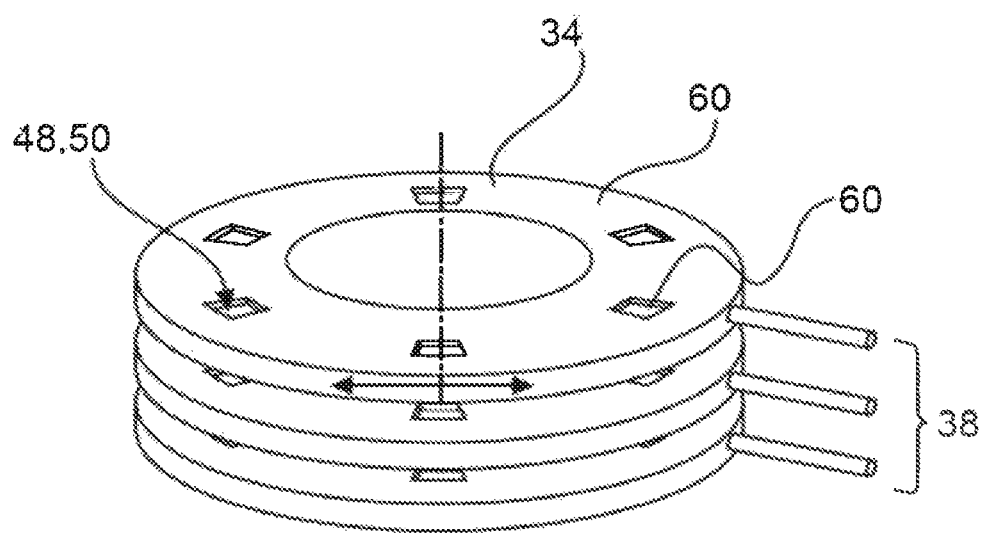
FIG. 9 shows a perspective view of the positioning and clamping device of FIG. 8.

In a modification shown in FIGS. 8 and 9, the fixing and clamping member 60 is formed on another disk that can be rotated concentrically with the elements 36, 40 of the capturing device, which are configured as disks. The driving device 38 may also be provided for this purpose, which is capable of moving the three elements differently from one another into different angular positions by means of drivers, wherein preferably the largest force can be introduced via the fixing and clamping member 60.

In the exemplary embodiment of the capturing device 32 shown in FIGS. 10 to 17, both the second recess 50 and the first recess 48 each have an oblique guide 44, 66. Preferably, both the oblique guide 58 formed on the first recess 48 and the oblique guide 66 formed on the second recess 50, are configured as funnel-shaped oblique inserting portions 58. For this purpose, the first recess 48 is not configured to be rectangular, as described above in the other exemplary embodiment, but also with a narrower region 54 and a wider region 56 and with an at least partially oblique rim 52. In this case, the inclination angles on the first and second oblique guides 44, 66 are formed in opposite directions. Particularly preferably, this may be realized in such a way that the first recess 48 and the second recess 50 are formed in a mirror-inverted manner Preferably, the narrower region 54 extends over a smaller distance in the circumferential direction (=tangential direction) than the wider region 56.

Figure 10:
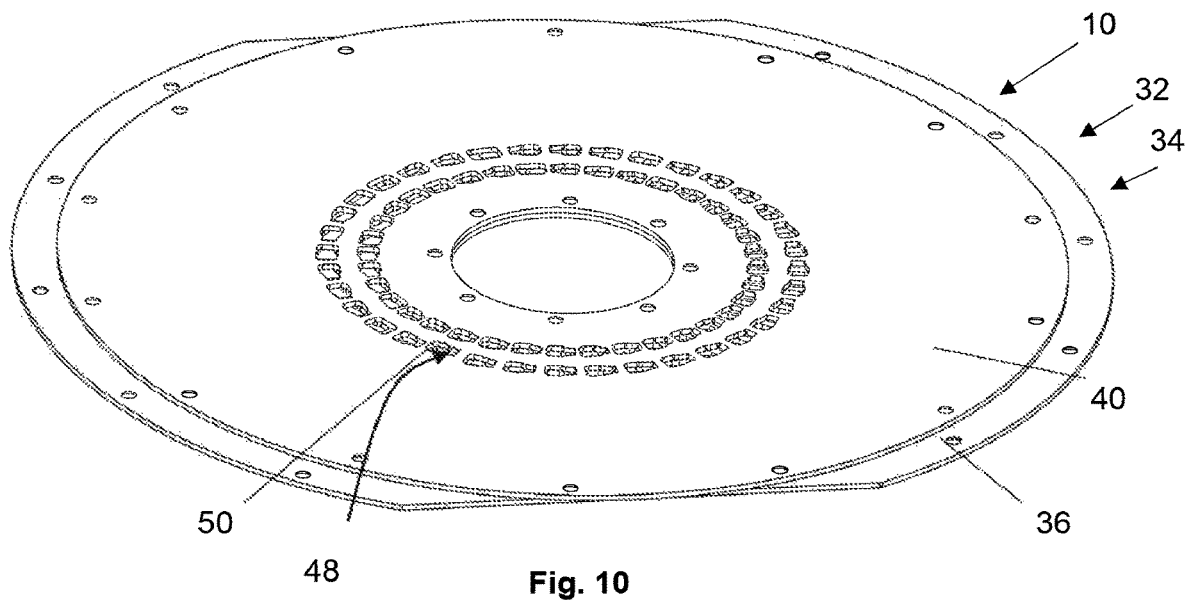
FIG. 10 shows a perspective view of another embodiment of the positioning and clamping device in a receiving position for receiving wire ends.

As can be seen particularly in FIGS. 10 and 15, the first and second element 36, 40 preferably have at least one ring arrangement of the recesses 48, 50, and more preferably several concentric ring arrangements, in such a way that one first recess 48 and one second recess 50, respectively, are located at the same radial and tangential position and can thus overlap each other. The number of concentric ring arrangements depends on the number of the wire ends to be clamped provided per groove 20. The embodiment shown in FIGS. 10 to 17 has a first and a second ring arrangement. This is suitable, for instance, for a stator 16 in which four wire segments with protruding wire ends 12a-12d are provided for each groove 20. The number of recesses per ring arrangement may correspond, for example, to the number of grooves.

Figure 11:
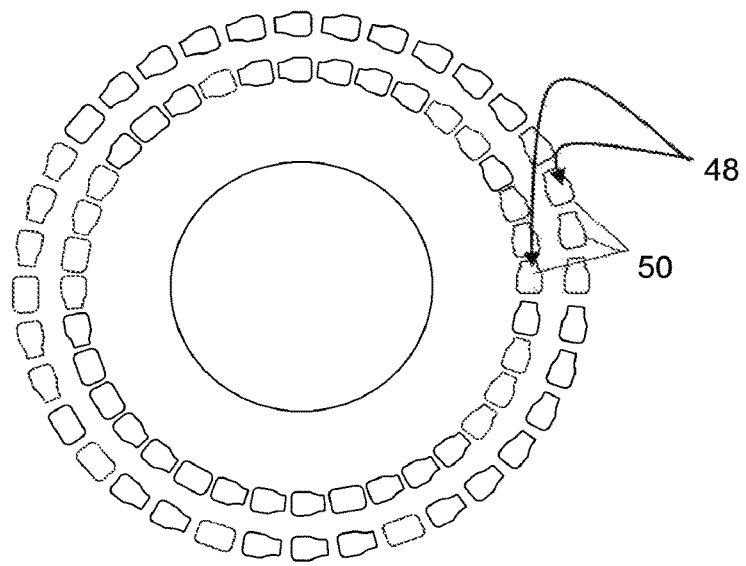
FIG. 11 shows a top view onto an arrangement of recesses of the positioning and clamping device of FIG. 10 in the receiving position.
Figure 12:
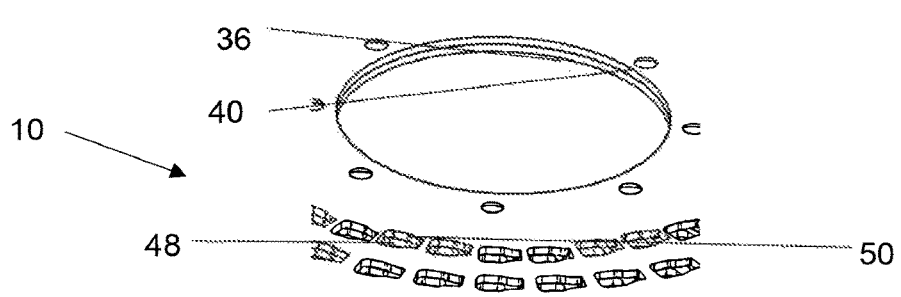
FIG. 12 shows a perspective view of a detail of FIG. 11.
Figure 17:
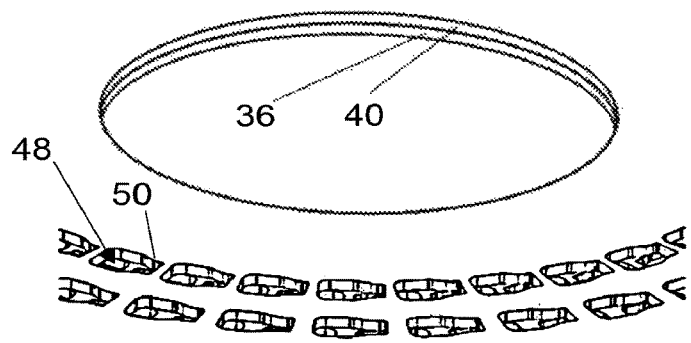
FIG. 17 shows a view as in FIG. 12, wherein the clamping position is depicted.

FIGS. 10 to 12 show the capturing device 32 and thus, the positioning and clamping device 10, in a receiving position in which the first and second recesses 48, 50 overlap with their wider regions 56 to the greatest possible extent and thus form a large receiving opening for receiving the wire ends 12a-12d to be positioned. By means of a relative rotation of the first and second elements 36, 40, the elements 36, 40 end up in a clamping position, in which only the narrower regions 54 of the first and second recesses 48, 50 overlap, as is shown in FIGS. 14 to 17.

As is apparent particularly from FIGS. 13 and 14, the oblique guides 44, 66 do not have to extend in a straight fashion; rather, rims 52 whose at least partially oblique extent has a curvature are preferred. Also, the transitions are preferably rounded so as to enable a guidance without jamming or catching.

Figure 18:
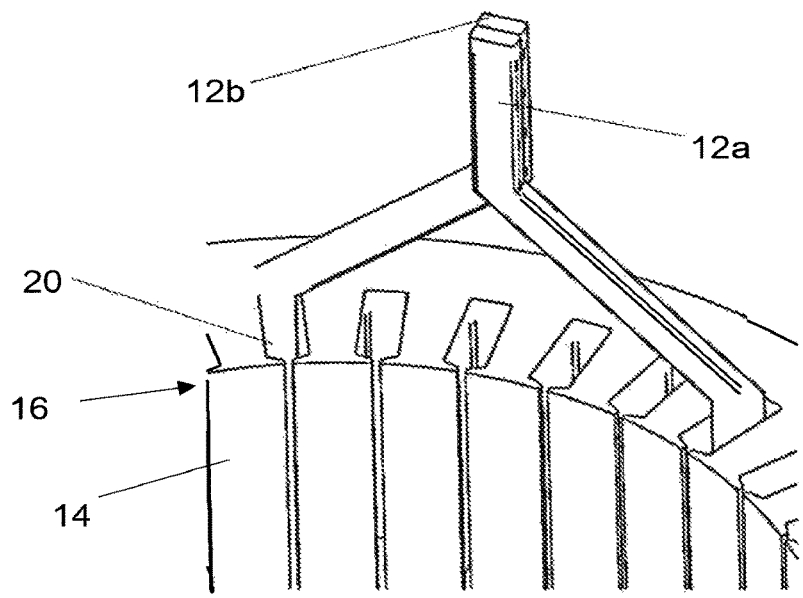
FIG. 18 shows a perspective view of a machine element, such as a stator of an electric machine, with a schematic representation of wire ends to be positioned and clamped together prior to the positioning and clamping device as shown in FIGS. 10 to 13 being placed thereon.
Figure 19:
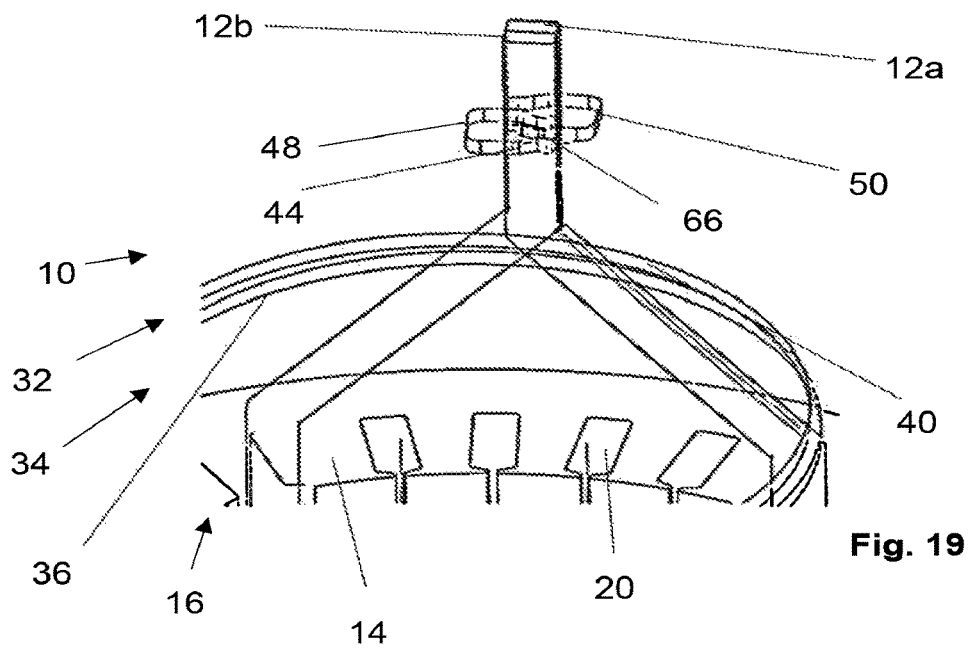
FIG. 19 shows the machine element of FIG. 18, wherein the first and second recesses are indicated in the clamping position.
Figure 20:
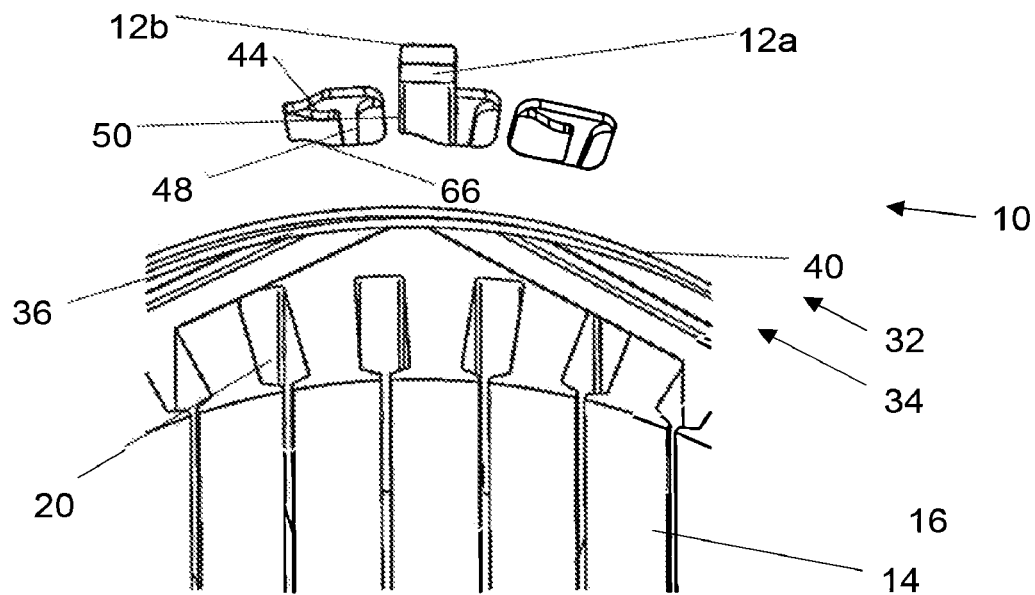
FIG. 20 shows the machine element of FIGS. 18 and 19 with the positioning and clamping device placed thereon in the clamping position.

FIGS. 18 to 20 outline an example for positioning and clamping with a positioning and clamping device 10 according to FIGS. 10 to 17, wherein only one wire end pair with the associated first and second recesses 48, 50 is shown for illustration purposes. In the receiving position, the positioning and clamping device 10 is moved relatively towards the machine element 14 shown in FIG. 18 in the axial direction, so that the wire ends 12a, 12b are inserted into the large receiving opening.

Then, a relative movement of the elements 36, 40 from the receiving position into a clamping position takes place. If the elements 36, 40, which are configured as clamping disks, for instance, are located in an intermediate position (half closed) during the course of this movement, the wire ends are radially orientated via the oblique guides 44, 66, so that the wire ends are already radially positioned in this position but still may deviate in the circumferential direction (tangential direction).

In FIGS. 19 and 20, the first and second elements 36, 40 are in the clamping position (e.g., clamping disks closed). Here, the wire ends 12a, 12b are clamped between the radially extending, narrower rims of the first and second recesses 48, 50, so that they are correctly positioned also in the tangential direction.

Figure 21:
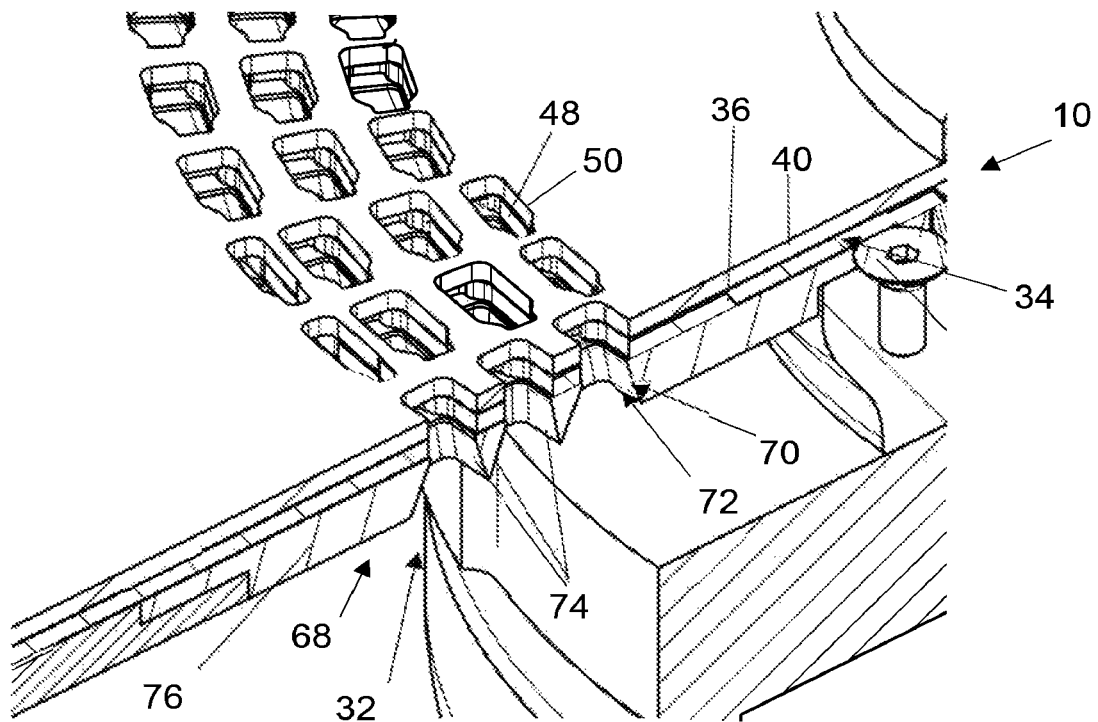
FIG. 21 shows a perspective view, which is partially shown in cross section, of a partial area of another embodiment of the positioning and clamping device with insertion bevels.
Figure 22:
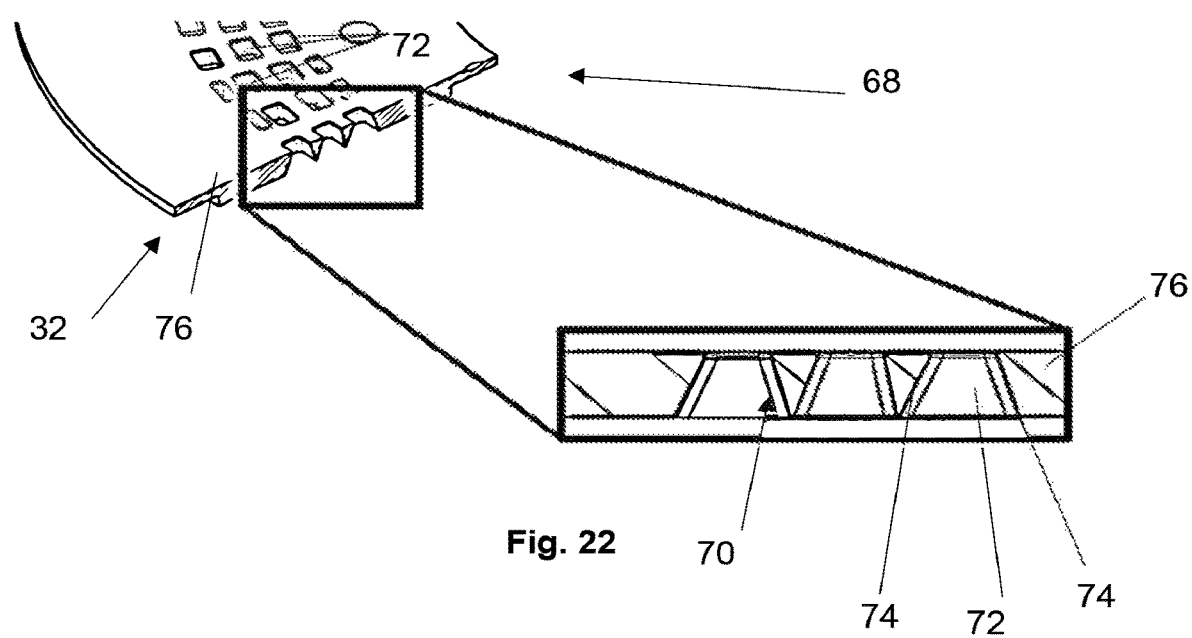
FIG. 22 shows a region, corresponding to FIG. 21, of the insertion aiding means of the positioning and clamping device of FIG. 21 together with an enlarged detailed representation thereof.

FIGS. 21 and 22 show another embodiment of the positioning and clamping device 10 in which the insertion aiding means 68 for facilitating an insertion of the wire ends 12a-12d in the axial direction into the first and second recesses 48, 50 is provided. The insertion aiding means 68 may be combined with any embodiment of the capturing device 32. In the example shown, the insertion aiding means 68 is combined with the capturing device according to the embodiment of FIGS. 10 to 20.

The insertion aiding means 68 also has an oblique guide, e.g., a third oblique guide 70, which may also be configured as a funnel-shaped oblique inserting portion. This oblique guide 70 is inclined in an axial direction and in a circumferential direction or in a radial direction.

For example, the insertion aiding means 68 is provided with a third recess 72, which is aligned with the first and second recesses 48, 50 in a receiving position of the positioning and clamping device 10. At least one rim of the third recess is beveled and thus forms an insertion bevel 74. Preferably, opposing rims of the third recess 72 are each provided with an insertion bevel with an opposite inclination, so that a funnel-shaped insertion aid is created.

If several first and second recesses 48, 50 are provided, a corresponding arrangement of third recesses 72 is preferably provided.

In one exemplary embodiment, the insertion bevels 74 are formed on a stationary plate serving, for example, as a base plate 76 on which the disk-shaped elements 36, 40 are rotatably mounted.

During the above-mentioned placement of the positioning and clamping device 10, the machine part 14 and the positioning and clamping device 10 are axially moved relative to each other. In the process, the first and second elements are located in the receiving position with their recesses 48, 50 overlapping wider regions in such a way that these wider regions also overlap the third recess 72. The wire ends are prepositioned by the insertion bevels 74 in the first and second recesses, or the insertion bevels 74 ensure that the wire end are able to end up in the first and second recesses at all. Then the process of the rotation in opposite directions of the first and second elements 36, 40 takes place, which was already described above, so that the wire ends are first positioned in the radial direction and are then positioned in the circumferential direction and subsequently clamped.

Thus, the insertion aiding means 68 may also be considered a further exemplary embodiment of the capturing device 32, while the two elements 36, 40 together form the fixing and clamping device 34.

In all embodiments, the driving device 38 may have a spring-driven, electric, pneumatic or hydraulic configuration. Preferably, it has an energy store, such as a spring, which can be locked and abruptly released, so that the driving device applies a strong relative movement impulse to the elements 36, 40 and, if applicable, clamping member 60. The torque forces for clamping a group of wires to be produced by the driving device may be in the range of 400 Nm to 3000 Nm, e.g., at 1800 Nm.

The features described with respect to the individual exemplary embodiments may be combined with one another in any way and may also be omitted in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Positioning and clamping device
12a-12d Wire end
14 Machine element
16 Stator
18 Coil winding
20 Groove
22 Manufacturing device
24 Bracket
26 Machining device
28 Welding device
30 Relative up-and-down movement machine element—positioning and clamping device
32 Capturing device
34 Fixing and clamping device
36 First Element
38 Driving device
40 Second Element
44 First oblique guide
48 First recess
50 Second recess
52 At least partially oblique rim
54 Narrower region
56 Wider region
58 Oblique inserting portion
60 Fixing and clamping member
62 Counter-holder
64 Plunger
66 Second oblique guide
68 Insertion aiding means
70 Third oblique guide 72 Third recess
74 Insertion bevel
76 Base plate

The invention claimed is:

1. A positioning and clamping device for positioning and clamping at least one wire end for further processing during production of a machine element of an electric machine, the positioning and clamping device being movable relative to the machine element from which the at least one wire end protrudes and comprising:
 a capturing device configured to capture and position the at least one wire end, wherein the capturing device has at least one oblique guide configured, during a relative movement in a circumferential direction of the positioning and clamping device, to guide the at least one wire end in a radial direction,
 wherein the capturing device has a first element with a plurality of first recesses arranged in a plurality of concentric rings and a second element with a plurality of second recesses arranged in a plurality of concentric rings,
 wherein the first and second elements can be moved relative to each other,
 wherein a first recess from the plurality of first recesses and a second recess from the plurality of second recesses overlap each other at least partially in such a way that the at least one wire end can be received within the recesses and rims of the recesses move closer towards or apart from each other during the relative movement of the first and second elements,
 at least one first rim of the first recess extending at least partially obliquely in a radial direction;
 at least one first rim of the second recess extending at least partially obliquely,
 wherein the at least one first rim of the first recess and the at least one first rim of the second recess overlap when viewed through the first and second recesses,
 wherein the first and second recesses overlap each other at least partially in such a way that only a single pair of wires can be received within the recesses, and,
 each recess having a contour completely formed by the first element or the second element such that the contours of the recesses are not connected.

2. The positioning and clamping device according to claim 1, further comprising:
 an axial oblique guide, which extends in an axial direction and in a radial direction.

3. The positioning and clamping device according to claim 1, wherein at least one of the following is true:
 opposite rims of one or at least one of the recesses form a funnel-shaped oblique insertion region,
 the inclination directions of the obliquely extending regions of the first rim of the first and second recesses are opposite,
 opposite rims of the first recess form a first funnel-shaped oblique insertion region and opposite rims of the second recess form a second funnel-shaped oblique insertion region, wherein the oblique insertion regions are disposed opposite to each other, or
 the at least one first rim that extends at least partially obliquely is a rim extending in a circumferential direction.

4. The positioning and clamping device according to claim 1, wherein at least one of the following is true:
 at least one of the first or the second element are configured as a disk or annular disk or as a disk segment or annular disk segment,
 the first and second elements can be rotated relative to each other about a common rotation axis, or
 the pluralities of first and second recesses is disposed distributed about an axis, wherein several at least one of first or second elements are provided, which, relative to each other, can be moved radially with respect to the axis.

5. The positioning and clamping device according to claim 1, wherein the capturing device is configured as a single-item device for handling one wire end or one wire end pair or as a multiple-item device for simultaneously handling a plurality of wire ends or a plurality of wire end pairs.

6. The positioning and clamping device according to claim 1, wherein at least one of the following is true:
 the capturing device is configured for fixing and clamping the at least one wire end,
 in addition to the capturing device, a fixing and clamping device for fixing and clamping the at least one wire end pre-positioned by means of the capturing device is also provided, or
 an insertion aid to axially insert wire ends into recesses of the positioning and clamping device is provided, with at least one insertion aid at least one of extending in an axial direction, with an oblique insertion portion extending in the axial direction, or an insertion funnel extending in the axial direction.

7. The positioning and clamping device according to claim 6, wherein at least one of the following is true:
 the fixing and clamping device has a fixing and clamping member, which is movable relative to the capturing device, for fixing and clamping the at least one wire end between the capturing device and the fixing and clamping member,
 the fixing and clamping device has a fixing and clamping member and a counter-holder, which can be moved relative to each other for fixing and clamping the at least one wire end between them,
 the fixing and clamping device has, as a fixing and clamping member, a movably driven plunger,
 the fixing and clamping device is configured as a single-item device for handling one wire end or one wire end pair or as a multiple-item device for simultaneously handling a plurality of wire ends or a plurality of wire end pairs,
 the capturing device and the fixing and clamping device are provided with a common drive unit or coupled drive units for performing the capturing, pre-positioning, fixing and clamping during a movement, or that the capturing device and the fixing and clamping device can be moved independently of each other,
 the insertion aid is configured in a stationary manner, and at least one of the capturing device or the fixing and clamping device have at least one element that can be moved or rotated relative to the insertion aiding means, or
 the insertion aiding means is configured as a single-item device for handling one wire end or one wire end pair or as a multiple-item device for simultaneously handling a plurality of wire ends or a plurality of wire end pairs.

8. A production device for producing a machine element of an electric machine, comprising a positioning and clamping device according to claim 1, and a machining device configured to process the at least one clamped wire end.

9. The production device according to claim 8 wherein the machining device comprises at least one of a welding device, a cutting device or a forming device.

\* \* \* \* \*